United States Patent
Benhase et al.

(10) Patent No.: US 7,107,400 B2
(45) Date of Patent: Sep. 12, 2006

(54) SYSTEM, APPARATUS, AND PROCESS FOR EVALUATING PROJECTED CACHE SIZES

(75) Inventors: Michael Thomas Benhase, Tucson, AZ (US); Thomas Charles Jarvis, Tuscon, AZ (US); Robert John Kolvick, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 10/403,324

(22) Filed: Mar. 31, 2003

(65) Prior Publication Data

US 2004/0193801 A1 Sep. 30, 2004

(51) Int. Cl.
*G06F 12/00* (2006.01)
(52) U.S. Cl. ..................................... 711/118
(58) Field of Classification Search ................ 711/118
See application file for complete search history.

(56) References Cited

U.S. PATENT DOCUMENTS

| | | | |
|---|---|---|---|
| 4,463,424 A * | 7/1984 | Mattson et al. ............. | 711/136 |
| 4,947,319 A | 8/1990 | Bozman ..................... | 364/200 |
| 5,293,609 A * | 3/1994 | Shih et al. .................. | 711/137 |
| 5,452,440 A | 9/1995 | Salsburg ..................... | 395/463 |
| 5,627,994 A | 5/1997 | Levy et al. .................. | 395/477 |
| 5,713,003 A * | 1/1998 | DeWitt et al. .............. | 711/118 |
| 5,875,464 A * | 2/1999 | Kirk ........................... | 711/129 |
| 6,324,621 B1 | 11/2001 | Singh et al. ................. | 711/129 |
| 6,327,644 B1 | 12/2001 | Beardsley et al. .......... | 711/136 |
| 6,952,664 B1 * | 10/2005 | Lahiri et al. ................ | 703/14 |
| 2001/0021959 A1 * | 9/2001 | Holmberg et al. .......... | 711/104 |
| 2003/0229761 A1 * | 12/2003 | Basu et al. .................. | 711/134 |

* cited by examiner

*Primary Examiner*—Mano Padmanabhan
*Assistant Examiner*—Duc T Doan
(74) *Attorney, Agent, or Firm*—Kunzler & Associates

(57) ABSTRACT

A process, apparatus, and system for evaluating a projected cache size implement and manage one or more projected cache lists that each contains directory entries corresponding to a projected cache size. The projected cache size may be either smaller or larger than the actual size of a cache installed in a computer system. Using the projected cache list entries, performance statistics such as cache hit ratio and average access time are tracked for each list. The process, apparatus, and system may calculate performance parameters that describe the performance specific to the actual cache list and each projected cache list. The resulting performance statistics may be used to formulate an optimization parameter to be communicated to a user or an administrator application.

11 Claims, 9 Drawing Sheets

SYSTEM, APPARATUS, AND PROCESS FOR EVALUATING PROJECTED CACHE SIZES

BACKGROUND OF THE INVENTION

1. Field of the Invention

The present invention relates to the field of data caching within computer systems and more particularly to the field of projected cache structures used to evaluate performance of a cache.

2. Description of Related Art

Cache memory is widely employed in contemporary computer systems. Cache memory is a type of fast-access memory that is typically used to buffer certain information for rapid access that is permanently stored in slower-access memory, such as a magnetic disk or other direct access storage device (DASD). Since cache memory can be substantially more expensive than magnetic disk storage having the same storage capacity, most computer systems have a relatively limited amount of cache memory.

To maximize the efficient use of cache memory, most systems implement a caching strategy that manages the type of data stored in the cache memory and the format in which the data is stored. One commonly employed caching strategy is a least-recently-used (LRU) replacement strategy in which a double-linked list of cache entries is created to identify the data content stored in the cache. This LRU cache list may contain multiple entries that are arranged in order of how recently a data set has been requested by a user or application. At the beginning of the list is the most recently used (MRU) entry. At the end of the list is the least recently used (LRU) entry.

Each time data is requested by a user or application, the system determines if the requested data is stored in the cache. A variety of ways exist to perform full or partial reviews of the cached data. If the requested data is stored and located in the cache memory, the system returns a cache hit and makes the requested data available. The cache list entry corresponding to the requested data may be repositioned at the MRU location. The remaining cache list entries are sequentially demoted. If the requested data is not located or found in the cache memory, the system returns a cache miss, retrieves the requested data in the DASD or other memory, and copies the requested data to the cache list. The retrieved data is generally copied to the MRU location of the cache list and the remaining cache list entries are demoted, with the LRU entry being pushed out of the LRU directory list.

One goal of cache management systems is to implement a caching strategy that maintains a high hit ratio and a corresponding low average data access time for data requests. However, currently no mechanism or process exists that is capable of determining how simulating a projected cache size, different from an actual cache size, might affect the cache performance for a given system. Currently, in order to determine how a different cache size might impact the performance of a cache subsystem or a computer system, the actual cache size must be physically altered either by removing existing cache or adding additional cache.

The prior art does set forth limited proposals that may impact the performance of a given cache, but nothing addresses the performance of a projected cache size. One method set forth in the prior art is to allocate certain portions of actual cache memory to multiple applications that are requesting data at approximately the same time. This implementation addresses the performance of an installed cache, but does not reach the potential impact of a projected cache size.

The prior art also discusses employing a cache arbiter that monitors the cache demands and balances such demands with other demands for processor storage. The arbiter dynamically alters the size of cache available to a given application through the utilization of expanded storage resources. The objective of this method is to dynamically utilize expanded storage resources in order to maximize the system throughput. Nevertheless, this implementation does not address the potential impact on cache performance of a projected cache size.

The prior art further addresses the possibility of implementing cache statistics in order to predict cache hit rates and determine the best data candidates for caching. Still further, the prior art sets forth a method for compressing some or all of the data stored in cache memory in order to make additional cache resources available for storing additional data content. Once again, while these prior art conceptions attempt to address the performance of actual cache memory in a computer system, they do not reach the potential performance impact of a projected cache size.

Consequently, what is needed is a process, apparatus, and system that are configured to monitor cache performance statistics, such as cache hit ratios and average access times, associated with a projected cache size without the space overhead of a physically larger cache. Beneficially, such a process, apparatus, and system would be further configured to compare projected performance parameters to actual performance parameters and communicate an optimization parameter to a user or administrator application.

BRIEF SUMMARY OF THE INVENTION

The present invention has been developed in response to the present state of the art, and in particular, in response to the problems and needs in the art that have not yet been fully solved by currently available cache subsystems. Accordingly, the present invention has been developed to provide a system, apparatus, and process for evaluating a projected cache size that overcome many or all of the above-discussed shortcomings in the art.

The apparatus for evaluating a projected cache size is provided with a logic unit containing a plurality of modules configured to functionally execute the necessary steps of monitoring and managing actual and projected cache lists. These modules in the described embodiments include a actual cache management module, a projected cache management module, an optimization module, an actual performance module, a projected performance module, and a cache region identification module.

The apparatus, in one embodiment, is configured to implement one or more projected cache lists in concurrence with an actual cache list. Each projected cache list includes a set of cache list entries that are associated with a projected cache size that is different from the actual cache size. For example, a cache subsystem of the invention has a cache directory list with a number of entries that identify the data content in a cache of the subsystem. If the actual cache has 4 gigabyte of data content, in this example, a projected cache list may include a number of cache entries corresponding to a lesser amount, say 2 gigabytes of data content. In this way, the projected cache list may be a subset of the actual cache list. In an alternate embodiment, a projected cache list may include a number of cache entries corresponding to a greater amount of data content than is actually available in the cache subsystem, such as 6 gigabytes. This may be done by maintaining residual cache list entries that correspond to 2 gigabytes more than the actual 4 gigabyte storage capacity. In this case, the actual cache list is a subset of the projected cache list.

Whether the projected cache list is a subset of the actual cache list, as with the 2 gigabyte projected cache list, or vice-versa, as with the 6 gigabyte projected cache list, the apparatus is configured to manage both the actual cache list entries and the projected cache list entries. In one embodiment, the actual cache management module is configured to manage the cache list entries in the actual cache list. Similarly, the projected cache management module is configured in one embodiment to manage the cache list entries in the projected cache list. Such cache management may include the steps necessary to manage the cache list entries, such as add, remove, promote, demote, etc.

The apparatus is further configured in one embodiment to monitor the statistical performance of the actual cache list and each of the projected cache lists. In one embodiment, the actual performance module and projected performance module may be configured to fulfill this function. For example, the actual performance module may monitor and record the number of actual cache hits and actual cache misses. Similarly, the projected performance module may monitor and record the number of projected cache hits and misses corresponding to each of the projected cache lists. The actual and projected performance modules may be further configured to calculate one or more actual and projected cache performance parameters, such as an average access time, that describe the actual cache performance corresponding to the actual cache list and the projected cache performance corresponding to each of the projected cache lists, respectively.

In a further embodiment, the apparatus may be configured to communicate an optimum cache parameter to a user or administrator application. In one embodiment, the apparatus may employ the optimization module to determine an optimum cache size based on the best cache hit ratios. Alternately, the optimization module may use cost data in conjunction with the performance parameters to determine an optimum cache size based on a cost/performance parameter. In a still further embodiment, the optimization module may use another method of determining an optimum cache size based on the actual and projected performance parameters and any other number of related or external factors.

The apparatus may be further configured to employ the cache region identification module in one embodiment to manage a set of cache region pointers. The cache region pointers in one embodiment may be similar to pointers that mark the beginning (MRU) and end (LRU) of a prior art cache directory list. The cache region identification module in one embodiment may create and manage pointers that are specific to the actual cache list and each of the projected cache lists. For example, the cache region identification module may maintain pointers that identify the least recently used (LRU) entry for each of the actual and projected cache lists.

A system of the present invention for using a cache is also provided. The system may be embodied in the form of a computer system having a cache subsystem that is configured to carry out the functions of the various modules described above. In particular, the system in one embodiment includes a data processing unit and an I/O processing unit. The system also may include a cache subsystem configured to implement and maintain an actual cache list and one or more projected cache lists.

The system may further include an optimization module as described above that is configured to communicate a cache optimization parameter to a user or administrator program. The cache optimization parameter may include a cache size that provides a high cache hit ratio, in one embodiment, and alternately may include a series of cache hit ratios corresponding to series of actual and projected cache sizes. The cache optimization module may further communicate additional comparable information regarding the actual cache performance and the projected cache performance.

A process of the present invention for using a cache is also provided. The process in the disclosed embodiments substantially includes the steps necessary to carry out the functions presented above with respect to the operation of the described apparatus and system. In one embodiment, the process includes maintaining a list of cache entries, in the form of an actual cache list and one or more projected cache lists. The process also may include managing the cache entries designated as actual cache entries and projected cache entries.

In a further embodiment, the process includes calculating actual and projected performance parameters that are associated with the actual and projected cache directory lists, respectively. The process also includes in one embodiment communicating a cache optimization parameter to a user or appropriate application. In still a further embodiment, the process also includes employing one or more cache region identifiers in order to identify cache list entries associated with the actual cache list and the entries associated with each of the projected cache lists.

These features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figures 1, 2:
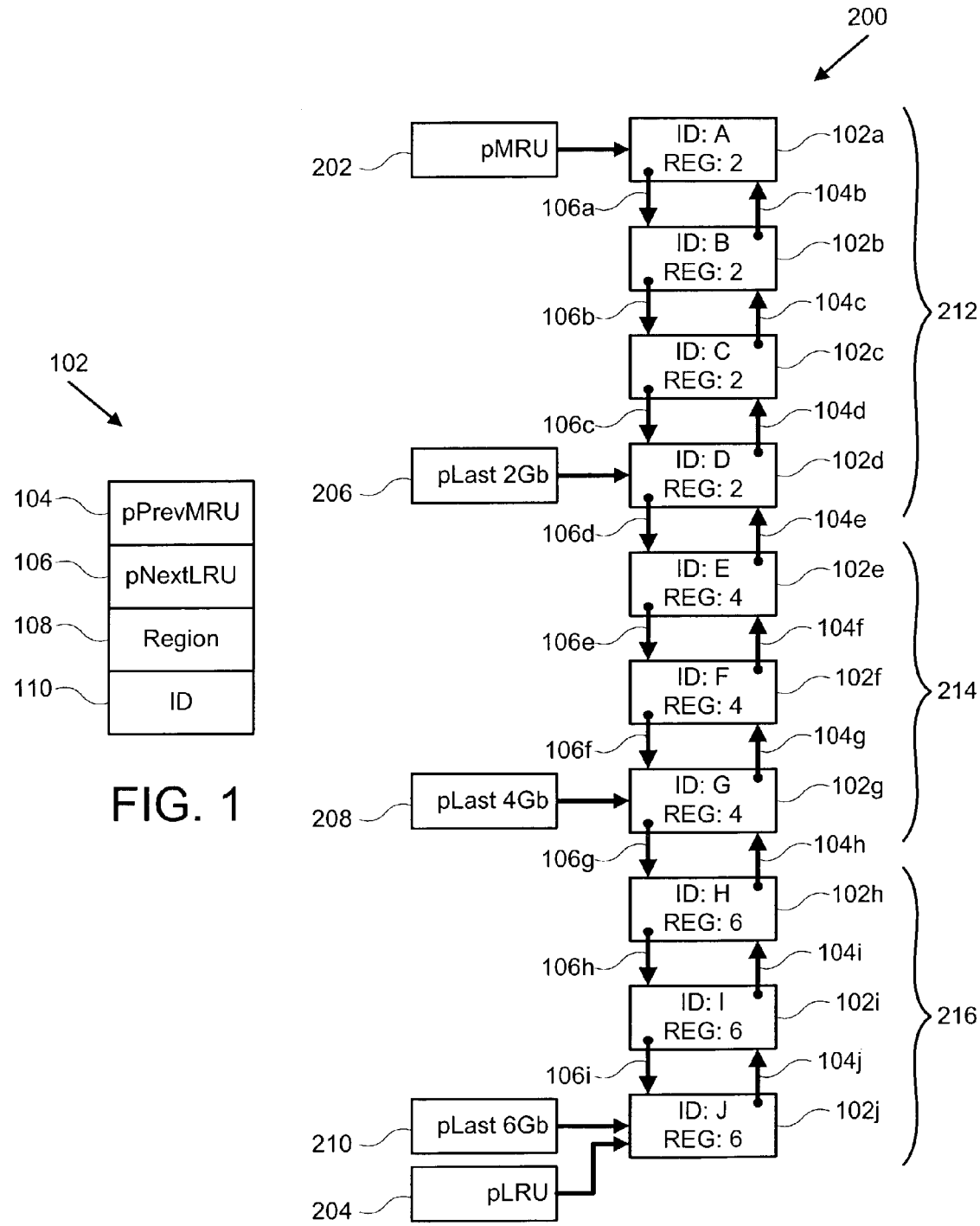
FIG. 1 is a schematic block diagram illustrating one embodiment of a representative cache list entry in accordance with the present invention.
FIG. 2 is a schematic block diagram illustrating one embodiment of a representative cache list in accordance with the present invention.

FIG. 1 depicts one embodiment of a cache list entry 102. The cache list entry 102 may correspond to a set of data that has been placed in cache memory for future rapid access. The illustrated cache list entry 102 of the depicted embodiment is basically a node within a linked list and includes a pPrevMRU pointer 104, a pNextLRU pointer 106, a region identifier 108, and a data identifier 110.

The pPrevMRU pointer 104, pNextLRU pointer 106, and region identifier 108 will be more fully explained in conjunction with the description of FIG. 2. The data identifier 110 in one embodiment identifies the data content that is associated with the particular cache list entry 102. The data identifier 110 may also identify the storage location of the corresponding data in the cache. The data identifier 110 also may identify a segment of memory that contains valid data. In essence, the data identifier 110 may be used in one embodiment to determine whether data requested by a user is located in the cache memory. If the requested data content is located within the cache memory and identified by a cache list entry 102, then the user request returns a cache hit. Otherwise, the user request returns a cache miss of course, the cache list entry 102 may contain data structures other than these that are illustrated.

FIG. 2 depicts one embodiment of a cache list 200. The cache list 200 includes a plurality of cache list entries 102a–102j, each of which are preferably substantially similar to the cache list entry 102 of FIG. 1. Thus, each of the cache list entries 102a–102j contains a corresponding pPrevMRU pointer 104b–104j, pNextLRU pointer 106a–106j, region identifier 108a–108j, and data identifier 110a–110j. The pPrevMRU pointers 104a–104j point to the previous, most recently used (MRU) cache list entry 102 in the cache list 200. Similarly, the pNextLRU pointers 106a–106j point to the next, least recently used (LRU) cache list entry 102 in the cache list 200. For example, the cache list entry 102c designated as "C" has a pPrevMRU pointer 104c that points to the cache list entry 102b designated as "B" and a pNextLRU pointer 106c that points to the cache list entry 102d designated as "D."

Each cache list entry 102a–102j also has a corresponding data identifier 110a–110j that is illustrated as "A" through "J." In the illustrated figure, the specific data contents of the data identifiers 110a–110j are not depicted. For example, the illustrated cache list entry 102c, designated as "C," preferably has a corresponding cache memory location or pointer of the data content associated with the cache list entry 102c, which are not depicted in FIG. 2.

The illustrated cache list 200 of FIG. 2 also depicts several cache list pointers including a pMRU pointer 202, a pLRU pointer 204, a pLast 2 Gb pointer 206, a pLast 4 Gb pointer 208, and a pLast 6 Gb pointer 210. The illustrated pMRU pointer 202 and pLRU pointer 204 are substantially similar to standard pointers typically employed in the art. In the current art, the pMRU pointer 202 typically identifies the most recently used (MRU) cache list entry 102a and the pLRU 204 identifies the least recently used (LRU) cache list entry 102j.

The pLast 2 Gb pointer 206, pLast 4 Gb pointer 208, and pLast 6 Gb pointer 210 also point to cache list entries 102 within the cache list 200. Each of these pointers 206, 208, 210 in one embodiment of the present invention identifies the corresponding last cache list entry 102 that would be available in a cache memory of a corresponding size. For example, in the illustrated cache list 200, the pLast 2 Gb pointer 206 identifies the cache list entry 102d, designated as "D." In one embodiment, this cache list entry 102d is the last cache entry 102 in a cache memory containing 2 gigabytes of storage capacity. In other words, the first incremental cache list 212 corresponding to a cache memory of 2 Gb capacity contains the cache list entries 102a–102d designated as "A" through "D." In a similar manner, the pLast 4 Gb pointer 208 and pLast 6 Gb pointer 210 identify the cache list entries 102g, 102j that would be the last cache list entries 102 in a cache memory containing 4 gigabytes and 6 gigabytes of storage capacity, respectively.

It follows that the second incremental cache list 214 includes the cache list entries 102e–102g, designated as "E" through "G," that would be included in a 4 Gb cache but not in a 2 Gb cache. Similarly, the third incremental cache list 216 includes the cache list entries 102h–102j designated as "H" through "J" that would be included in a 6 Gb cache but not in a 4 Gb cache.

While the depicted cache list pointers 206, 208, 210 correspond to cache memories having 2, 4, and 6 gigabytes of capacity, respectively, there is no inherent limitation on the quantity or location of such cache list pointers 206, 208, 210.

Figure 3:
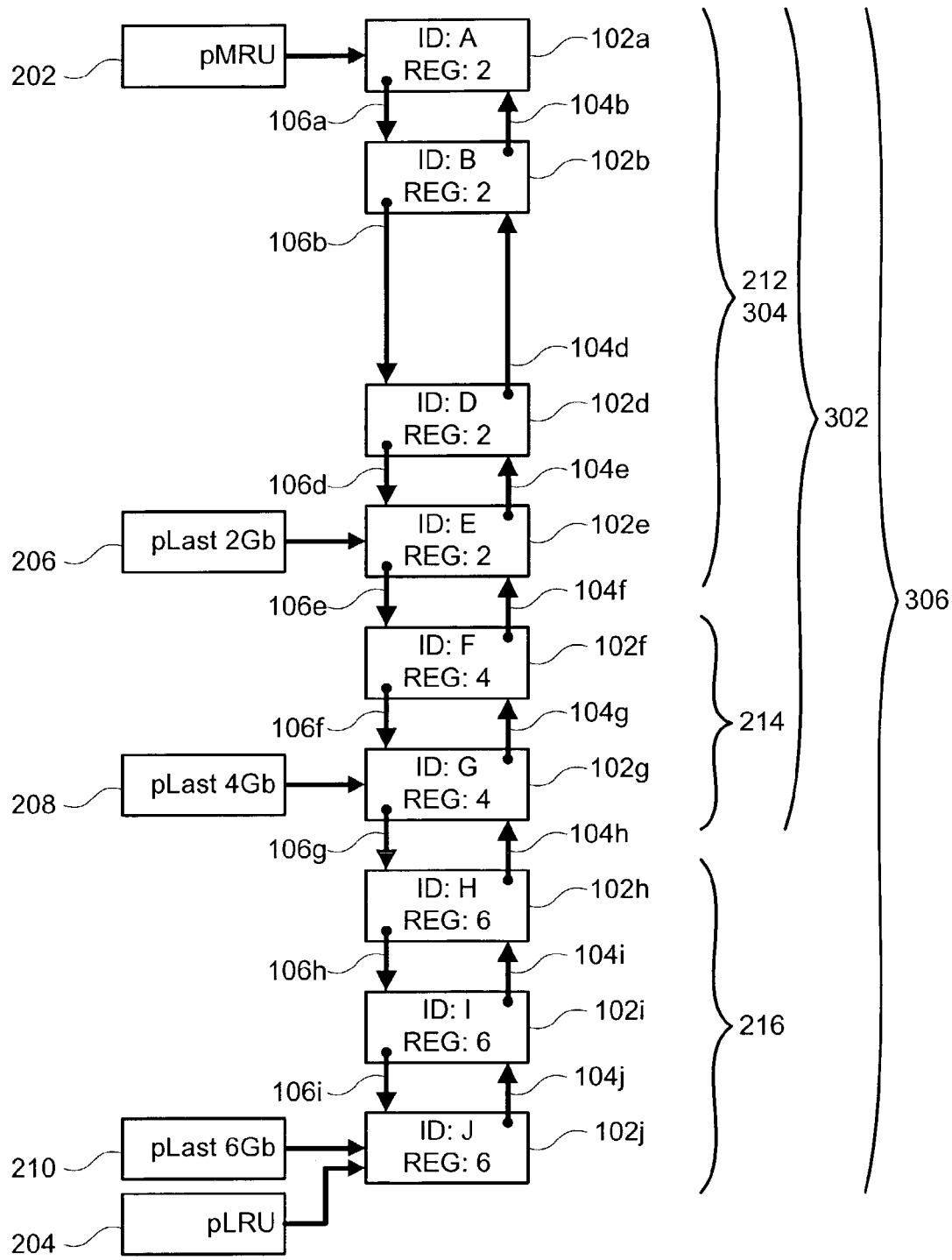
FIG. 3 is a schematic block diagram illustrating one embodiment of a representative cache list after removal of an entry in accordance with the present invention.

For purposes of explanation throughout the remainder of this description, the pLast 4 Gb pointer 208 will be assumed to correspond by way of example to a cache size of 4 gigabytes capacity. The cache size will be referred to herein as the "actual cache size." This example is illustrated in FIG. 3, in which the incremental cache lists 212, 214 together will be referred to as the actual cache list 302. The actual cache list 302 includes the actual cache list entries 102a–102g designated as "A" through "G" with the exception of "C" that has been removed from the cache list 200 shown in FIG. 3.

As described above, the actual cache list 302 includes the first incremental cache list 212 and the second incremental cache list 214. In this scenario, the first incremental cache list 212 may also be referred to as a first projected cache list 304 because it is associated with a projected cache size, 2 gigabytes, that is different from the actual cache size, 4 gigabytes. In a further embodiment, the entire cache list 200, including all of the incremental cache lists 212, 214, 216, may be referred to as a second projected cache list 306. The illustrated second projected cache list 306 is associated with a projected cache size, 6 gigabytes, that is different from the actual cache size, 4 gigabytes.

In other words, the depicted cache list 200 of FIG. 3 has three cache list pointers 206, 208, 210 that correspond to different sizes of cache memory. In the scenario presented, the actual cache size of 4 gigabytes has a corresponding actual cache list 302 with entries 102a–102g that identify the data contained in the actual cache memory. The depicted cache list 200 is further defined by two projected cache lists 304, 306 that correspond to the data that would be contained within the cache memory if the cache memory had a capacity corresponding to the projected cache sizes. For example, if the cache size were 2 gigabytes, the first projected cache list 304 would contain the cache list entries 102a–102e to identify the data contained within a 2 gigabyte cache memory. Similarly, the second projected cache list 306 contains the cache list entries 102a–102j to identify the data that would be contained within a 6 gigabyte cache memory.

In one embodiment, the projected cache lists 304, 306 may be employed in order to determine how a cache subsystem might perform given a cache size that is different from the actual cache size. In the present case, if a cache subsystem actually incorporates 4 gigabytes of cache memory, the projected cache list 306 may be implemented to determine the change in system performance corresponding to a projected cache memory having 6 gigabytes of capacity.

FIG. 3 also illustrates a situation in which one of the cache list entries 102c has been removed from the cache list 200. As depicted, upon removing the cache list entry 102c, designated as "C," from the cache list 200, the pPrevMRU pointer 104d is modified to point to the cache list entry 102b designated as "B." In a similar manner, the pNextLRU pointer 106b is modified to point to the cache list entry 102d designated as "D." In this way, the cache list 200 maintains links to all of the remaining cache entries 102a–102b, 102d–102j in the cache list 200.

With the removal of the cache list entry 102c and under the conditions of a 4 gigabyte actual cache memory described above, the pLast 2 Gb pointer 206 is also modified to point to the cache list entry 102e designated as "E." This cache list entry 102e is essentially promoted into the first projected cache list 304. In this manner, the first projected cache list 304 includes all of the cache entries 102a, 102b, 102d, 102e that would be available in a 2 gigabyte projected cache memory after removal of the specified cache list entry 102c. The pLast 4 Gb pointer 208 is not updated, however, because with an actual cache memory capacity of 4 gigabytes the actual cache list 302 would not be typically modified. The presence of the incremental cache list 216 does not affect this cache management process. Additionally, the pLast 6 Gb pointer 210, pMRU pointer 202, and pLRU pointer 204 are not updated.

A cache list 200 as depicted in FIG. 3 may be the result of a predefined cache cleanup process or some other process that removes certain cache entries 102 and corresponding data from the cache memory. Alternately, the removal of the cache entry 102c, designated as "C," may be in preparation to move that same cache list entry 102c to the most recently used position in the cache list 200. This latter process is illustrated in FIG. 4.

Figure 4:
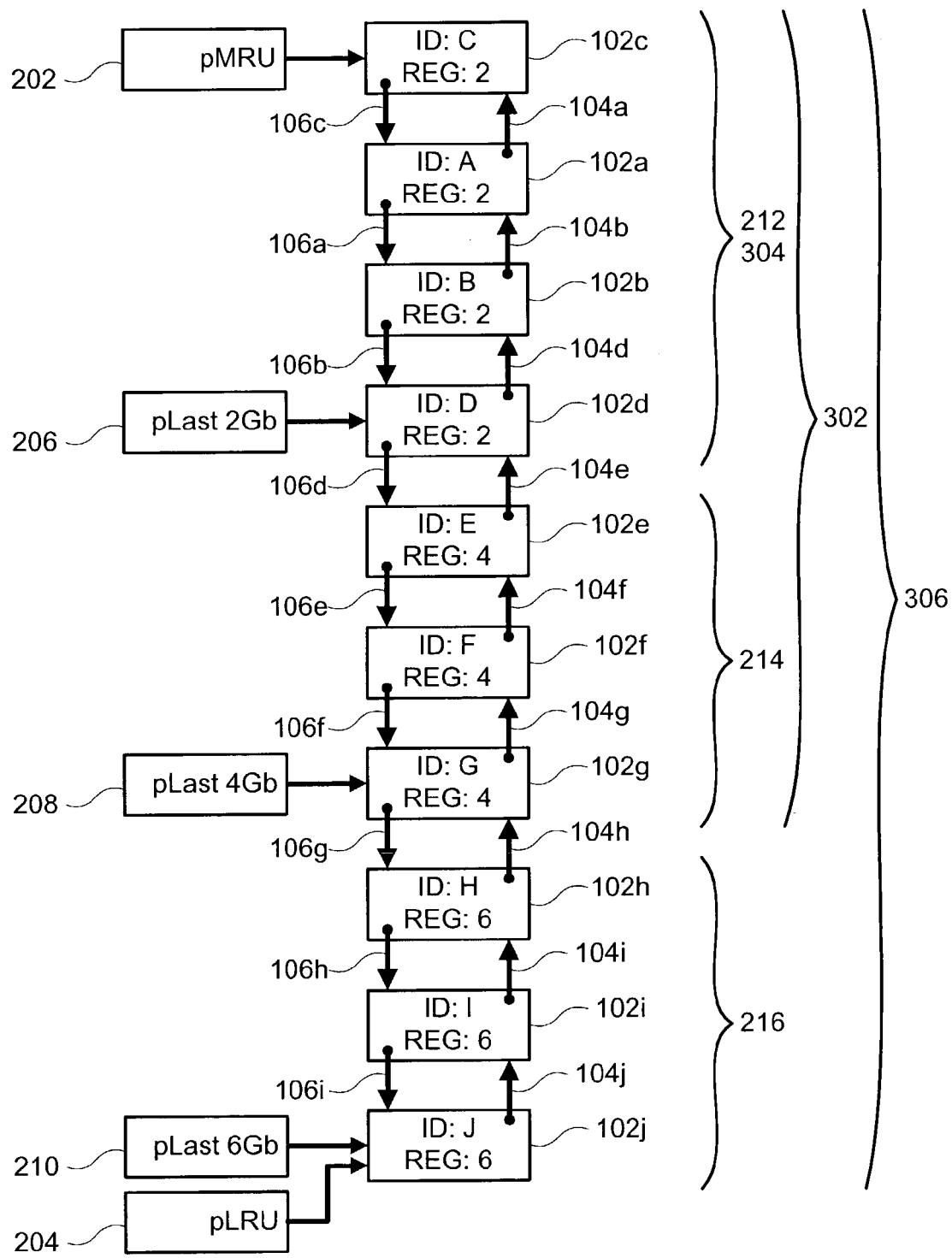
FIG. 4 is a schematic block diagram illustrating one embodiment of a representative cache list after promotion of an entry in accordance with the present invention.

FIG. 4 depicts a cache list 200 in which the cache list entry 102c designated as "C" has been added to the cache list 200 in the most recently used (MRU) position. This may be in response to a request to access the data associated with the identified cache list entry 102c, as in the case of a cache hit. In the illustrated cache list 200 of FIG. 4, the pMRU pointer 202 has been modified to point to the recently added cache list entry 102c. In relation to the cache list 200 depicted in FIG. 3, the pLast 2 Gb pointer 206 has also been modified again to point to the cache list entry 102d designated as "D."

As described before, the pMRU pointer 202 is configured to identify the most recently used (MRU) cache list entry 102, and the pLast 2 Gb pointer 206 is configured to identify the last cache list entry 102 corresponding to a cache memory having 2 gigabytes of capacity. Once again, the pLast 4 Gb pointer 208, pLast 6 Gb pointer 210, and pLRU pointer 204 are not modified.

Figure 5:
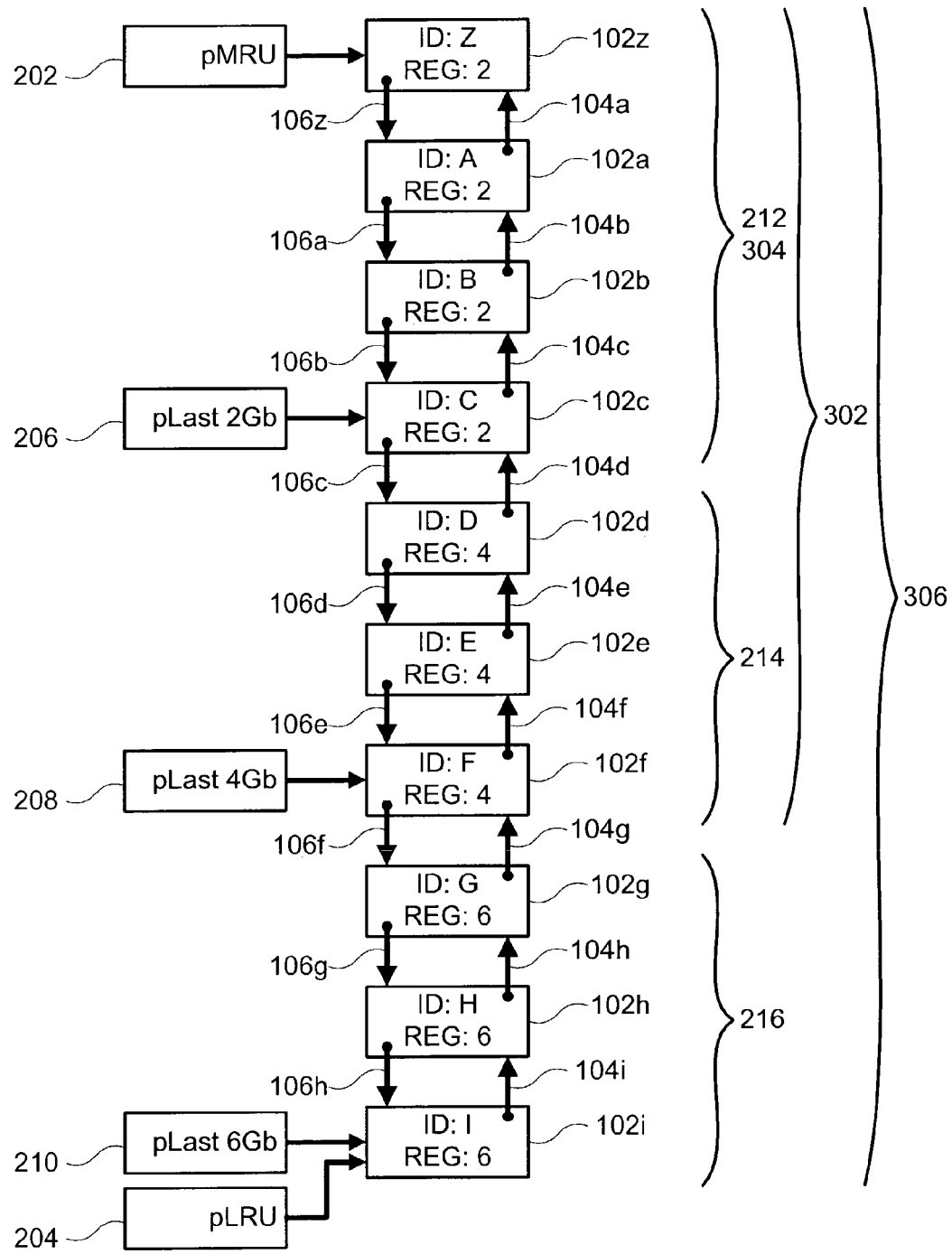
FIG. 5 is a schematic block diagram illustrating one embodiment of a representative cache list after addition of a new entry in accordance with the present invention.

FIG. 5 is similar to FIG. 4 and depicts one embodiment of a cache list 200 in which a new cache list entry 102 has been added. FIG. 5, however, depicts a scenario in which a user request returns a cache miss and the cache list entry 102z, designated as "Z," is added to the most recently used position of the cache list 200. Accordingly, the data corresponding to this cache list entry 102z may be loaded into cache memory.

When the new cache list entry 102z is added to the cache list 200, all cache list entries 102a–102j are essentially shifted to allow the new cache list entry 102z to be placed in the most recently used (MRU) position. The pMRU pointer 202 is modified to point to this new cache list entry 102z. Similarly, the pLRU pointer 204, pLast 2 Gb pointer 206, pLast 4 Gb pointer 208, pLast 6 Gb pointer 210 are each modified to point to the corresponding cache list entries 102. Methods of updating the pMRU pointer 202 and pLRU pointer 204 are commonly known and applied in the art.

Under the scenario described above in which the actual cache size is 4 gigabytes, the result of updating these pointers 202, 204, 206, 208, 210 is that each of the cache region pointers 206, 208, 210 identifies the new last cache list entry 102 for the corresponding size of actual or projected cache memory. It can be seen that the cache list entry 102d designated as "D" has been demoted from the first projected cache list 304 shown in FIG. 5. In like manner, the cache list entry 102j designated as "J" from FIG. 2 has been demoted from the second projected cache list 306 and from the cache list 200 altogether. Similarly, the cache list entry 102*g* designated as "G" has been demoted from the actual cache list 302. The data content formerly associated with this cache list entry 102*g* and stored in the cache memory may be made available for other caching purposes.

In summary, FIGS. 2, 3, and 4 together represent one embodiment of the incremental stages in a cache hit process in which the cache list entry 102*c*, designated as "C," is requested by a user, found in the cache list 200, and moved to the most recently used (MRU) position in the cache list 200. In this illustrated process, the system may return an actual cache hit because the requested data was in the cache and the corresponding cache list entry 102*c* is in the actual cache list 302. Similarly, the system may provide a projected cache hit for the 2 gigabyte projected cache list 304 because the corresponding cache list entry 102*c* is in the first projected cache list 304. Additionally, the system may provide a projected cache hit for the 6 gigabyte projected cache list 306 because the corresponding cache list entry 102*c* is in the second projected cache list 306.

If, in an alternate embodiment, a user requests data corresponding to the cache list entry 102*g*, designated as "G," in the cache list 200 of FIG. 2, the system may provide an actual cache hit because the requested data is in the cache memory and the corresponding cache list entry 102*g*, is in the cache list 200. The system may also provide a projected cache hit for the second projected cache list 306, but not for the first projected cache list 304. If in a further embodiment, a user requests data corresponding to the cache list entry 102*h*, designated as "H," in the cache list 200 of FIG. 2, the system might only provide, for example, a projected cache hit for the 6 gigabyte projected cache list 306 and cache misses for the 2 gigabyte projected cache list 304 and the 4 gigabyte actual cache list 302.

FIGS. 2 and 5 together represent a similar embodiment of the incremental stages in a cache miss process. In this process, when a user requests data for which a copy is not currently stored in the cache, such as the data corresponding to the cache list entry 102*z*, designated as "Z," the system provides cache misses for all three cache lists 302, 304, 306 and modifies the cache list 200 as described in conjunction with FIG. 5.

Figure 6:
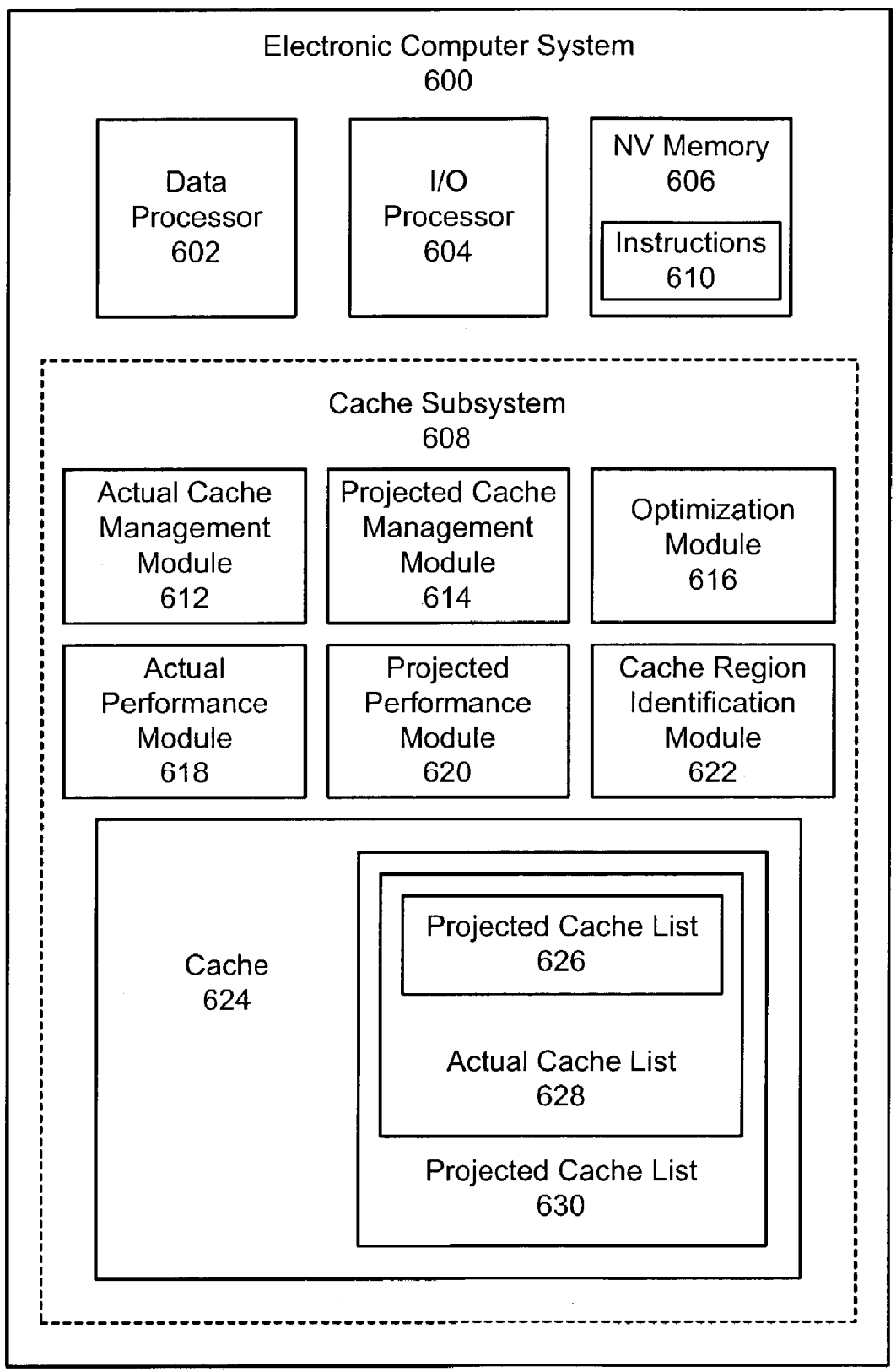
FIG. 6 is a schematic block diagram illustrating one embodiment of a representative electronic computer system and cache subsystem in accordance with the present invention.

FIG. 6 depicts one embodiment of an electronic computer system 600 of the present invention. The illustrated electronic computer system 600 includes a data processor 602, an I/O processor 604, a non-volatile memory 606, and a cache subsystem 608. The data processor 602 is configured to process the data signals that are transmitted within the electronic computer system 600. The I/O processor 604 is configured to process the data signals to and from the electronic computer system 600. The non-volatile memory 606, such as a magnetic disk, may contain control instructions 610 that may be accessed for control of the electronic computer system 600.

The cache subsystem 608 in one embodiment includes an actual cache management module 612, a projected cache management module 614, an optimization module 616, an actual performance module 618, a projected performance module 620, a cache region identification module 622, and a cache 624. The depicted cache 624 includes a first projected cache list 626, an actual cache list 628, and a second projected cache list 630. The first projected cache list 626 is substantially similar to the first projected cache list 304 introduced in FIG. 3. In the same manner, the actual cache list 628 is substantially similar to the actual cache list 302 of FIG. 3. In addition, the second projected cache list 630 is substantially similar to the projected cache list 306 of FIG. 3. The cache 624 in one embodiment is also configured to store the data content referenced by the cache list entries 102 in the actual cache list 628.

The actual cache management module 612 is configured in one embodiment to manage the cache list entries 102 in the actual cache list 628. Similarly, the projected cache management module 614 is configured to manage the cache list entries 102 in the projected cache lists 626, 630. Such cache management may include the steps necessary for operations which add, remove, promote, demote, etc., the cache list entries 102 in the respective cache lists 626, 628, 630.

The actual performance module 618 and projected performance module 620 may be configured in one embodiment to monitor the statistical performance of the actual cache list 628 and each of the projected cache lists 626, 630, respectively. For example, the actual performance module 618 may monitor and record the number of actual cache hits and actual cache misses. The projected performance module 620 may similarly monitor and record the number of projected cache hits and misses corresponding to each of the projected cache lists 626, 630. The actual performance module 618 and projected performance module 620 may be further configured to use the number of respective cache hits and misses in order to establish actual and projected cache performance parameters that describe the actual cache performance using the actual cache list 628 and the projected cache performance using each of the projected cache lists 626, 630.

The optimization module 616 in one embodiment is configured to utilize the actual and projected cache performance parameters in order to determine an optimization parameter, such as an optimum cache size based on the best cache hit ratios. Alternately, the optimization module 616 may use cost data in conjunction with the performance parameters to determine an optimum cache size based on a cost/performance parameter. In a further embodiment, the optimization module 616 may use another method of determining an optimum cache size based on the performance parameters and any other number of related or external factors.

The cache region identification module 622 in one embodiment is configured to manage the cache region pointers, such as the pLast 2 Gb pointer 206, pLast 4 Gb pointer 208, and pLast 6 Gb pointer 210 introduced in FIG. 2. The cache region identification module 622 may be utilized to modify the number of cache region pointers 206, 208, 210 implemented for use with the cache list 200. The cache region identification module 622 may be further employed to modify such pointers 206, 208, 210 as the cache list entries 102 are modified within the cache list 200.

Figure 7:
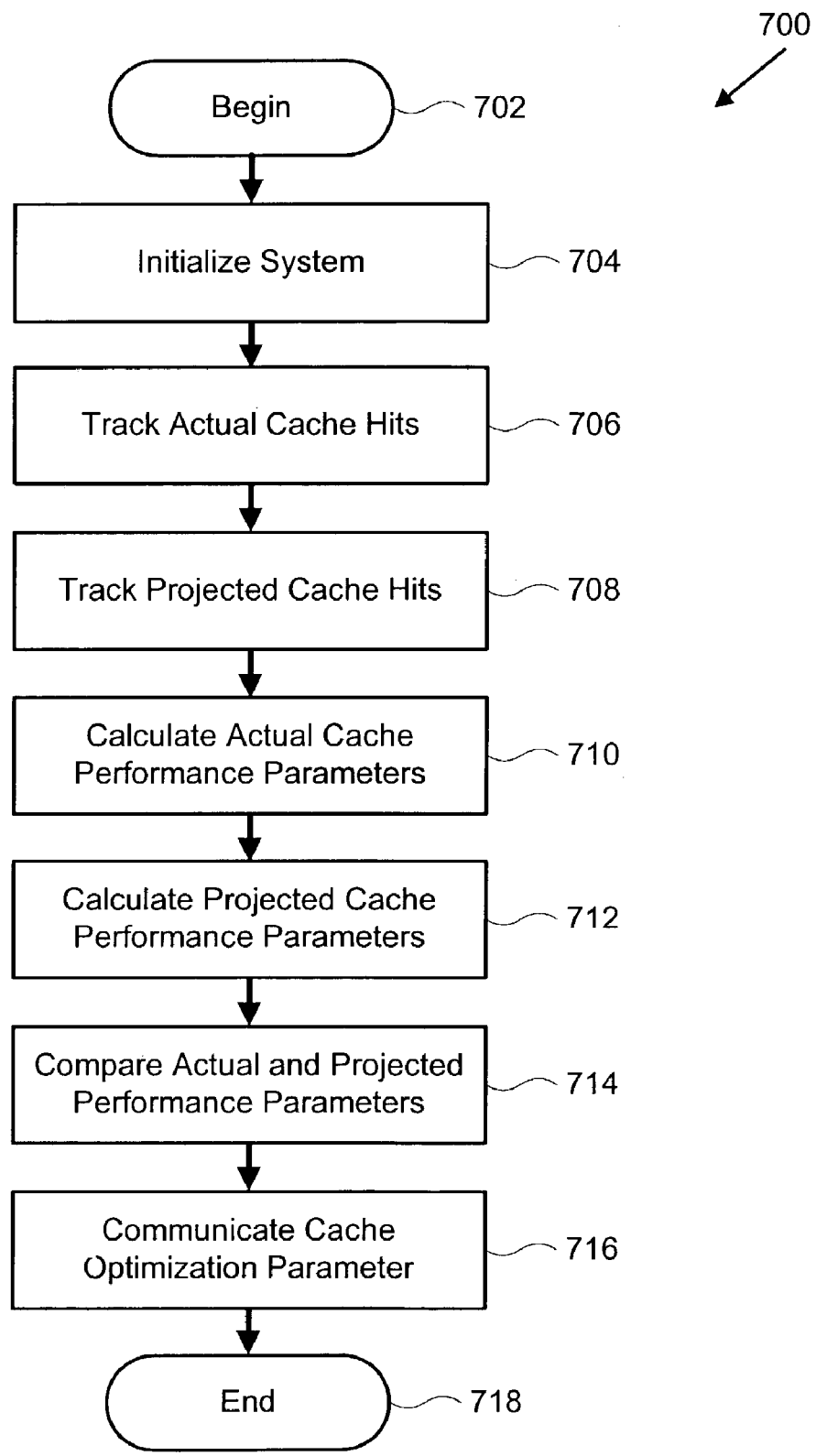
FIG. 7 is a schematic flow chart diagram illustrating one embodiment of a representative cache process in accordance with the present invention.

FIG. 7 depicts one embodiment of a cache process 700 of the present invention. The process 700 begins 702 with initialization 704 of the system 600. As a user or application requests data that is stored on the system 600, the cache subsystem 608 in one embodiment tracks space 706 the number of actual cache hits using the actual performance module 618. The cache subsystem 608 also tracks 708 the number of projected cache hits corresponding to each of the projected cache lists 626, 630 using the projected performance module 620. The tracking of actual cache hits and projected cache hits is preferably conducted using one or more of the structures described above.

At a time either predetermined by the cache subsystem 608 in one embodiment or manually invoked by a user in an alternate embodiment, the cache subsystem 608 calculates 710 an actual cache hit parameter using the actual performance module 618. The cache subsystem 608 also calculates 712 a projected cache hit parameter using the projected performance module 620. Using the calculated 710, 712 actual and projected cache performance parameters, the cache subsystem 608 through the optimization module 616 then compares 714 the actual and projected cache performance parameters and communicates 716 a cache optimization parameter to a user or administrator application. The administrator application may then dynamically alter the actual cache size obtained from the step 716 to achieve cache optimization on demand. The process 700 then ends 718.

Figure 8:
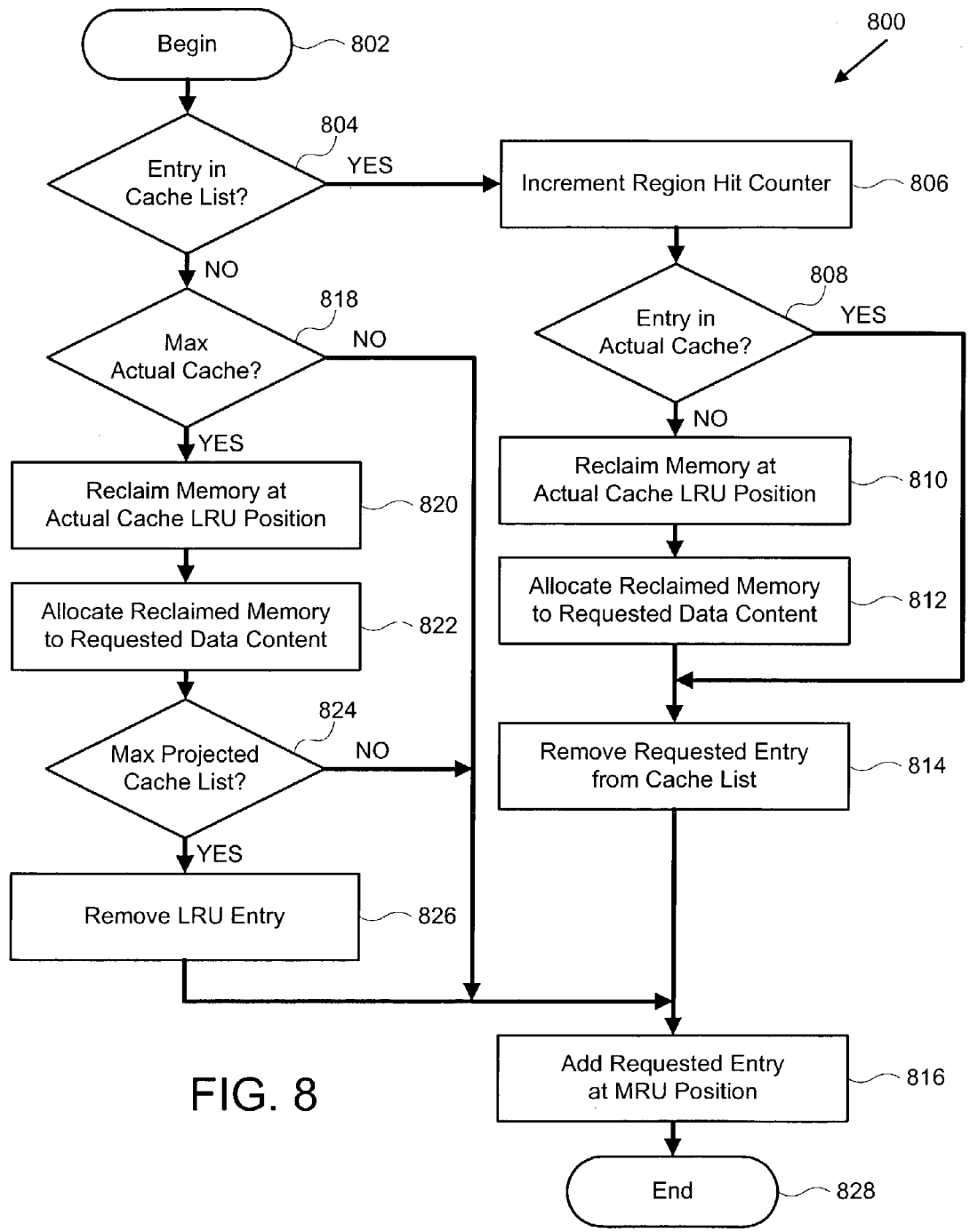
FIG. 8 is a schematic flow chart diagram illustrating one embodiment of a representative cache access process in accordance with the present invention.

FIG. 8 depicts one embodiment of a cache access process 800. The process 800 begins 802 when a data request is made by a user or application. Upon receipt of a data request, the cache subsystem 608 determines 804 whether there is a cache list entry 102 in the cache list 200 corresponding to the requested data content. If it is determined 804 that the requested data and corresponding cache list entry 102 are in the cache 624 (an actual or projected cache hit), the process 800 increments 806 a region hit counter for the region in which the cache list entry 102 is located. For example, if the data request identifies the cache list entry 102c designated as "C" in FIG. 2, the process 800 in response increments 806 a region hit counter for the 2 gigabyte region.

After incrementing 806 the appropriate region hit counter, the process 800 determines whether the requested cache list entry 102 is located in the actual cache list 628, including the projected cache list 626. If the cache list entry 102 is not in the actual cache 628 (a projected cache hit), the process 800 reclaims 810 the memory at the LRU position of the actual cache list 628, such as the cache list entry 102g designated as "G" in FIG. 3. The process 800 then allocates 812 the reclaimed memory to the projected cache list 630, in one embodiment by designating the cache list entry 102g to a location in the third incremental cache list 216 and the second projected cache list 630. In essence, the reclamation 810 and allocation 812 steps address moving a cache list entry 102 from the actual cache list 628 to the second projected cache list 630. In conjunction with this move, the data content of the moved cache list entry 102 may be abandoned and the memory made available for other caching purposes.

Once the cache region pointers 206, 208, 210 have been updated to show the change in cache list entries 102, the requested cache list entry 102 may be removed 814 from its current position and added 816 at the MRU position in the cache list 200. The process of removing a cache list entry 102 from the cache list 200 is further described in conjunction with FIG. 9. The process of adding a cache list entry 102 to the cache list 200 is further described in conjunction with FIG. 10.

If the process 800 determines 808 that the requested cache list entry 102 is in the actual cache list 628 (an actual cache hit), then the reclamation 810 and allocation 812 steps described above are not performed. Rather, the process 800 proceeds directly to the removal 814 and addition 816 steps previously explained.

If the process 800 determines 804 that the cache list entry 102 corresponding to the requested data content is not in the cache list 200 (a cache miss), the process 800 then determines 818 if the total actual cache memory has been allocated. If it has not, the process 800 proceeds to add 816 the requested data content and corresponding new cache list entry 102 to the cache list 200 at the most recently used (MRU) position.

If the process 800 determines 818 that the total actual cache memory has been allocated, the process 800 reclaims 810 the memory at the LRU position of the actual cache list 628 and allocates 822 the reclaimed memory to the projected cache list 630. These reclamation 820 and allocation 822 steps are substantially similar to the reclamation 810 and allocation 812 steps described previously.

The process 800 then determines 824 whether the total projected cache list memory has been allocated. If it has not, the process 800 proceeds to add 816 the requested data content and corresponding new cache list entry 102 to the cache list 200 at the most recently used (MRU) position. Otherwise, the process 800 removes 826 the cache list entry 102 in the least recently used (LRU) position, such as the cache list entry 102j, designated as "J" in FIG. 2. The process 800 then adds 816 the requested data content and corresponding new cache list entry 102 to the cache list 200 at the most recently used (MRU) position. After adding 816 the data content and cache list entry 102, the process 800 ends 828.

Figure 9:
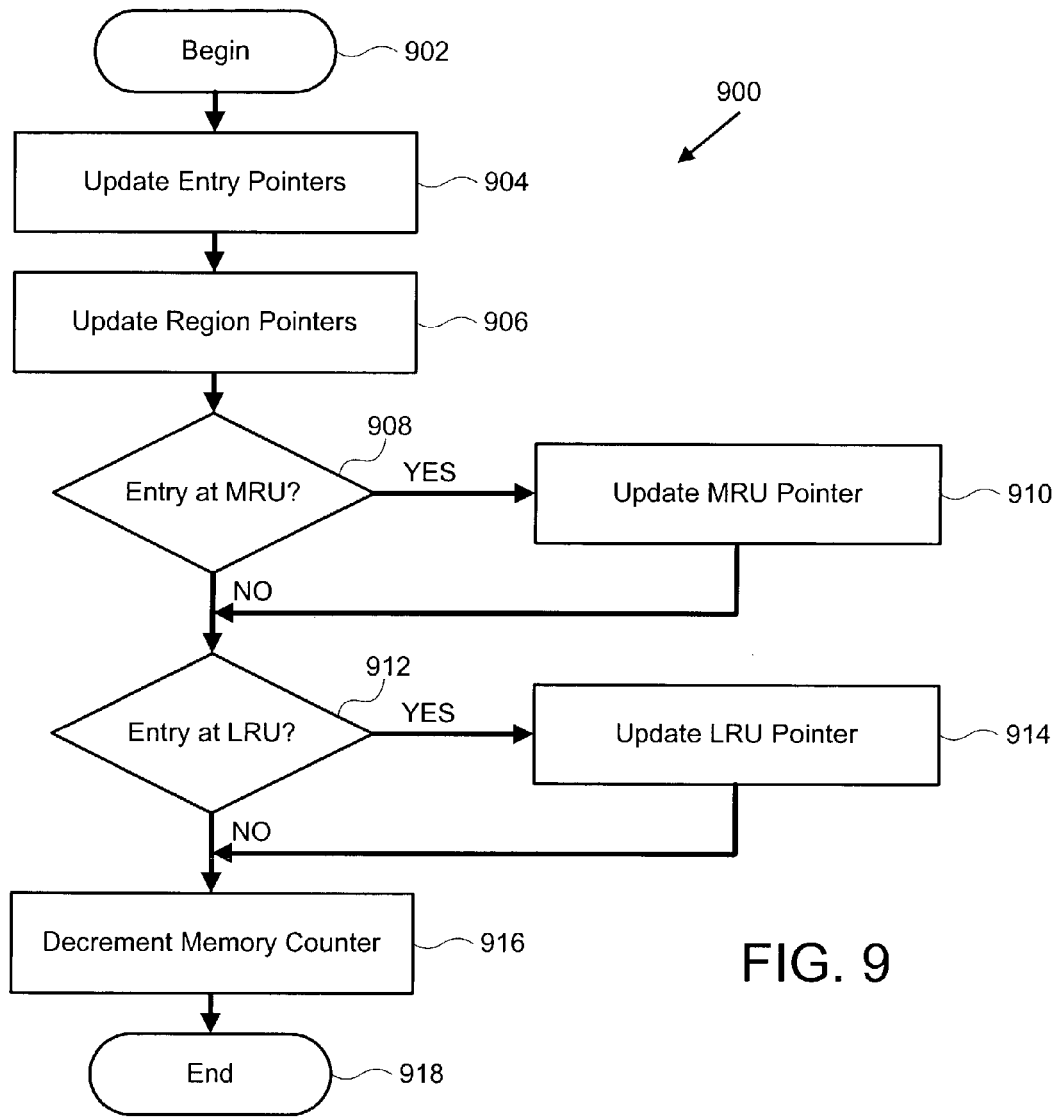
FIG. 9 is a schematic flow chart diagram illustrating one embodiment of a representative cache entry removal process in accordance with the present invention.

FIG. 9 depicts one embodiment of a representative cache entry removal process 900 of the present invention. The process 900 begins 902 by updating 904 the cache list entry pointers, such as the pPrevMRU pointer 204 and pNextLRU pointer 206 of the cache list entries 102 adjacent to the cache list entry 102 to be removed. One embodiment of this operation is illustrated in FIG. 3 in which the cache list entry 102c, designated as "C," has been removed from the cache list 200. In this embodiment, the pNextLRU pointer 106b has been updated to point to "D," and the pPrevMRU pointer 104d has been updated to point to "B." By updating the pointers 106b, 104d in this manner, the cache list entry 102c, designated as "C," is effectively removed from the cache list 200.

After updating 904 the appropriate entry pointers 104, 106, the process 900 updates 906 the cache region pointers 206, 208, 210. One manner of doing so is illustrated in FIG. 3. Specifically, in the depicted embodiment, the pLast 2 Gb pointer 206 has been updated to point to the cache list entry 102e designated as "E." Prior to removal of "C," the pLast 2 Gb pointer pointed to the cache list entry 102d designated as "D." In conjunction with updating 906 the cache region pointers 206, 208, 210 the process 900 in one embodiment modifies the region identifier 108 of the corresponding cache list entries 102. For example, the region identifier 108e (identification tag not shown) for the cache list entry 102e designated as "E" has been modified from "4" to "2" to designate that it is now within the 2 gigabyte projected cache list 304.

Once the cache region pointers 206, 208, 210 have been updated 906, the process 900 determines 908 whether the cache list entry 102 to be removed is in the most recently used (MRU) location. If so, the process 900 updates 910 the pMRU pointer 202 to point to the next cache list entry 102. Otherwise, the process 900 proceeds to determine 912 whether the cache list entry 102 to be removed is in the least recently used (LRU) position. If so, the process 900 updates 914 the pLRU pointer 204 to point to the previous cache list entry 102. This update 914 is illustrated in the sequence of FIGS. 2 and 5, in which the pLRU pointer 204 originally points to "J" and is updated 914 to point to "I" after "J" is removed from the cache list 200. After updating 914 the pLRU pointer 204, the process 900 decrements 916 a total memory counter and ends 918.

Figure 10:
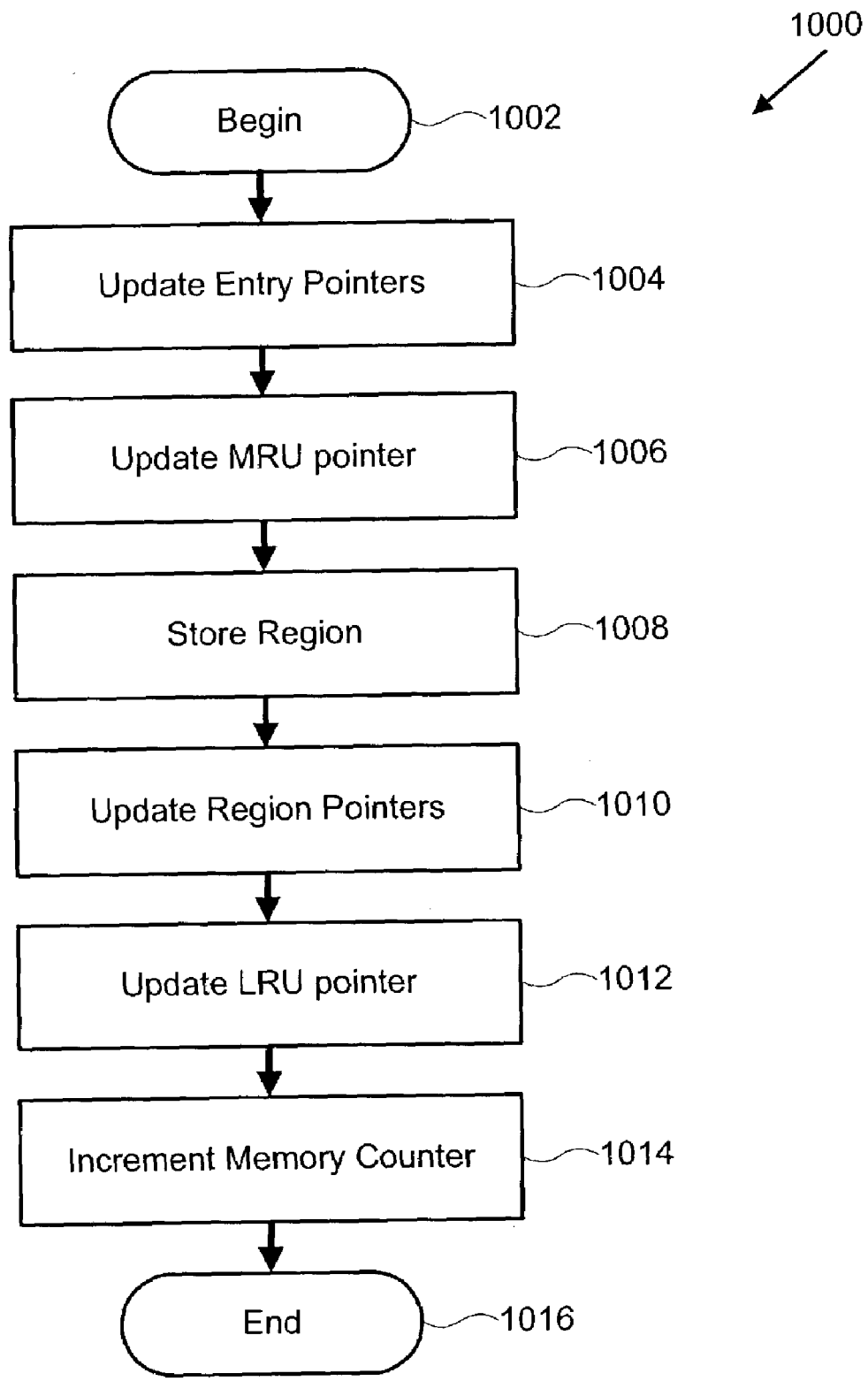
FIG. 10 is a schematic flow chart diagram illustrating one embodiment of a representative cache entry addition process in accordance with the present invention.

FIG. 10 depicts one embodiment of a cache entry addition process 1000. The process 1000 is similar to the cache entry removal process 900 described above. The process 1000 begins 1002 by updating 1004 the necessary cache entry pointers 104, 106 to insert the new cache list entry 102.

The process 1000 then updates 1006 the pMRU pointer 202 to point to the newly added cache list entry 102 and stores 1008 the region identifier 108 in the newly added cache list entry 102. The process 1000 then updates 1010 the cache region pointers 206, 208, 210 and updates 1012 the pLRU pointer 204 as needed. Finally, the process 1000 increments 1014 the total memory counter and ends 1016.

What is claimed is:

1. An apparatus for evaluating a projected cache size, the apparatus comprising:
    a plurality of cache entries organized in a cache list, the cache list comprising a plurality of actual cache entries wherein the actual cache entries of the cache list are employed by an operational cache to access cached data, an actual cache region pointer that indicates the least recently used actual cache entry for an actual cache size, a plurality of projected cache entries wherein the plurality of actual cache entries is a subset of the plurality of projected cache entries, and a projected cache region pointer that indicates the least recently used projected cache entry for a projected cache size;
    an actual cache management module configured to manage the plurality of actual cache entries associated with the actual cache size;
    a projected cache management module configured to manage the plurality of projected cache entries associated with the projected cache size;
    an actual performance module configured to calculate an actual cache performance parameter associated with the actual cache size; and
    a projected performance module configured to calculate a projected cache performance parameter associated with the projected cache size.

2. The apparatus of claim 1, further comprising an optimization module configured to communicate a cache optimization parameter associated with the projected cache size.

3. An apparatus for evaluating a projected cache size, apparatus comprising:
    a plurality of cache entries organized in a cache list, the cache list comprising a plurality of actual cache entries wherein the actual cache entries of the cache list are employed by an operational cache to access cached data, an actual cache region pointer that indicates the least recently used actual cache entry for an actual cache size, a plurality of projected cache entries wherein the plurality of actual cache entries is a subset of the plurality of projected cache entries, and a projected cache region pointer that indicates the least recently used projected cache entry for a projected cache size;
    an actual cache management module configured to manage the plurality of actual cache entries associated with the actual cache size;
    a projected cache management module configured to manage the plurality of projected cache entries associated with the projected cache size;
    a cache region identification module configured to manage the projected cache region pointer to identify the plurality of projected cache entries associated with the projected cache size;
    an actual performance module configured to calculate an actual cache performance parameter associated with the actual cache size;
    a projected performance module configured to calculate a projected cache performance parameter associated with the projected cache size; and
    a cache region identification module configured to manage the projected cache region pointer to identify the plurality of projected cache entries associated with the projected cache size.

4. A cache subsystem, the subsystem comprising:
    a cache configured to store a plurality of cache entries organized in a cache list, the cache list comprising a plurality of actual cache entries wherein the actual cache entries of the cache list are employed by an operational cache to access cached data, an actual cache region pointer that indicates the least recently used actual cache entry for an actual cache size, a plurality of projected cache entries wherein the plurality of actual cache entries is a subset of the plurality of projected cache entries, and a projected cache region pointer that indicates the least recently used projected cache entry for a projected cache size;
    an actual cache management module configured to manage the plurality of actual cache entries associated with the actual cache size;
    a projected cache management module configured to manage the plurality of projected cache entries associated with the projected cache size;
    a cache region identification module configured to manage the projected cache region pointer to identify the plurality of projected cache entries associated with the projected cache size;
    an actual performance module configured to calculate an actual cache performance parameter associated with the actual cache size;
    a projected performance module configured to calculate a projected cache performance parameter associated with the projected cache size; and
    an optimization module configured to communicate a cache optimization parameter associated with the projected cache size.

5. An electronic computer system having a cache subsystem, the system comprising:
    a data processing unit;
    an I/O processing unit configured to communicate data;
    an electronic storage device configured to store a plurality of cache entries organized in a cache list comprising a plurality of actual cache entries in a cache list organized as a linked list wherein the actual cache entries are employed by an operational cache to access cached data and each include a data identifier used to determine if data is in a cache, an actual cache region pointer that indicates the least recently used actual cache entry for an actual cache size, a plurality of projected cache entries in the cache list wherein the plurality of actual cache entries is a subset of the plurality of projected cache entries, and a projected cache region pointer that indicates the least recently used projected cache entry for a projected cache size;
    an actual cache management module configured to manage the plurality of actual cache entries associated with the actual cache size;
    a projected cache management module configured to manage the plurality of projected cache entries associated with the projected cache size;
    a cache region identification module configured to manage the projected cache region pointer to identify the plurality of projected cache entries associated with the projected cache size;

an actual performance module configured to calculate an actual cache performance parameter associated with the actual cache size;

a projected performance module configured to calculate a projected cache performance parameter associated with the projected cache size; and an optimization module configured to communicate a cache optimization parameter associated with a projected cache size.

6. A process for evaluating a projected cache size, the process comprising:

maintaining a list of cache entries in a cache list, the cache list comprising a plurality of actual cache entries wherein the actual cache entries of the cache list are employed by an operational cache to access cached data, an actual cache region pointer that indicates the least recently used actual cache entry for an actual cache size, a plurality of projected cache entries wherein the plurality of actual cache entries is a subset of the plurality of projected cache entries, and a projected cache region pointer that indicates the least recently used projected cache entry for a projected cache size;

managing the plurality of actual cache entries associated with the actual cache size;

managing the plurality of projected cache entries associated with the projected cache size;

calculating an actual cache performance parameter associated with the actual cache size;

calculating a projected cache performance parameter associated with the projected cache size; and managing the projected cache region pointer to identify the plurality of projected cache entries associated with the projected cache size;

communicating a cache optimization parameter associated with the projected cache size to an administrator.

7. A process for evaluating a projected cache size, the process comprising:

maintaining a plurality of actual cache entries associated with an actual cache size in a cache list wherein the actual cache entries of the cache list are employed by an operational cache to access cached data;

maintaining an actual cache region pointer that indicates the least recently used actual cache entry for the actual cache size;

maintaining a plurality of projected cache entries associated with a projected cache size in the cache list wherein the plurality of actual cache entries is a subset of the plurality of projected cache entries;

maintaining a projected cache region pointer that indicates the least recently used projected cache entry for the projected cache size;

managing the plurality of actual cache entries;

managing the plurality of projected cache entries;

identifying the plurality of projected cache entries associated with the projected cache size;

calculating an actual cache performance parameter associated with the actual cache size;

calculating a projected cache performance parameter associated with the projected cache size;

managing the projected cache region pointer to identify the plurality of projected cache entries associated with the projected cache size;

communicating a cache optimization parameter associated with the projected cache size to an administrator; and receiving a cache size adjustment from the administrator.

8. A computer readable storage medium comprising computer readable code configured to carry out a process for evaluating a projected cache size, the process comprising:

maintaining a list of cache entries organized in a cache list, the cache list comprising a plurality of actual cache entries wherein the actual cache entries of the cache list are employed by an operational cache to access cached data, an actual cache region pointer that indicates the least recently used actual cache entry for an actual cache size, a plurality of projected cache entries wherein the plurality of actual cache entries is a subset of the plurality of projected cache entries, and a projected cache region pointer that indicates the least recently used projected cache entry for a projected cache size, and wherein the plurality of projected cache entries is a subset of the plurality of actual cache entries;

managing the plurality of actual cache entries associated with the actual cache size;

managing the plurality of projected cache entries associated with the projected cache size;

calculating an actual cache performance parameter associated with the actual cache size;

calculating a projected cache performance parameter associated with the projected cache size;

managing the projected cache region pointer to identify the plurality of projected cache entries associated with the projected cache size; and communicating a cache optimization parameter associated with the projected cache size.

9. A computer readable storage medium comprising computer readable code configured to carry out a process for evaluating a projected cache size, the process comprising:

maintaining a plurality of actual cache entries associated with an actual cache size in a cache list wherein the actual cache entries of the cache list are employed by an operational cache to access cached data;

maintaining an actual cache region pointer that indicates the least recently used actual cache entry for the actual cache size;

maintaining a plurality of projected cache entries associated with a projected cache size in the cache list, wherein the plurality of actual cache entries is a subset of the plurality of projected cache entries;

maintaining a projected cache region pointer that indicates the least recently used projected cache entry for the projected cache size;

managing the plurality of actual cache entries;

managing the plurality of projected cache entries;

identifying the plurality of projected cache entries associated with the projected cache size;

calculating an actual cache performance parameter associated with the actual cache size;

calculating a projected cache performance parameter associated with the projected cache size;

managing the projected cache region pointer to identify the plurality of projected cache entries associated with the projected cache size; and communicating a cache optimization parameter associated with the projected cache size.

10. An apparatus for evaluating a projected cache size, apparatus comprising:

means for maintaining a list of cache entries in a cache list organized as a linked list, the cache list comprising a plurality of actual cache entries wherein the actual cache entries of the cache list are employed by an operational cache to access cached data, an actual cache region pointer that indicates the least recently used actual cache entry for an actual cache size, a plurality of projected cache entries, and a projected cache region pointer that indicates the least recently used projected cache entry for a projected cache size;

means for managing the plurality of actual cache entries associated with the actual cache size;

means for managing the plurality of projected cache entries associated with the projected cache size wherein the plurality of actual cache entries is a subset of the plurality of projected cache entries;

means for calculating an actual cache performance parameter associated with the actual cache size;

means for calculating a projected cache performance parameter associated with the projected cache size;

means for managing the projected cache region pointer to identify the plurality of projected cache entries associated with the projected cache size; and means for communicating a cache optimization parameter associated with the projected cache size to an administrator.

11. An apparatus for evaluating a projected cache size, the apparatus comprising:

means for maintaining a plurality of actual cache entries associated with an actual cache size in a cache list organized as a linked list wherein the actual cache entries of the cache list are employed by an operational cache to access cached data;

means for maintaining an actual cache region pointer that indicates the least recently used actual cache entry for the actual cache size;

means for maintaining a plurality of projected cache entries associated with a projected cache size in the cache list wherein the plurality of actual cache entries is a subset of the plurality of projected cache entries;

means for maintaining a projected cache region pointer that indicates the least recently used projected cache entry for the projected cache size;

means for managing the plurality of actual cache entries;

means for managing the plurality of projected cache entries;

means for identifying the plurality of projected cache entries associated with the projected cache size;

means for calculating an actual cache performance parameter associated with the actual cache size;

means for calculating a projected cache performance parameter associated with the projected cache size;

means for managing the projected cache region pointer to identify the plurality of projected cache entries associated with the projected cache size;

means for communicating a cache optimization parameter associated with the projected cache size to an administrator; and means for receiving a cache size adjustment from the administrator.

* * * * *